United States Patent
Leong et al.

(10) Patent No.: US 9,100,112 B1
(45) Date of Patent: Aug. 4, 2015

(54) LATENCY BUILT-IN SELF-TEST

(71) Applicant: Altera Corporation, San Jose, CA (US)

(72) Inventors: Han Hua Leong, San Jose, CA (US); Yanjing Ke, Union City, CA (US)

(73) Assignee: Altera Corporation, San Jose, CA (US)

(*) Notice: Subject to any disclaimer, the term of this patent is extended or adjusted under 35 U.S.C. 154(b) by 0 days.

(21) Appl. No.: 14/331,973

(22) Filed: Jul. 15, 2014

(51) Int. Cl.
*H04B 3/46* (2006.01)
*H04B 17/00* (2015.01)

(52) U.S. Cl.
CPC .................... *H04B 17/0037* (2013.01)

(58) Field of Classification Search
CPC .......... H04B 3/46; H04B 3/462; H04B 17/00; H04B 17/0085; H04B 17/10; H04B 17/101; H04B 17/104; H04B 17/11; H04B 17/14; H04B 17/15; H04B 17/16; H04B 17/19; H04B 10/07; H03L 7/00
USPC ......... 375/224, 226, 228, 354, 356, 357, 358, 375/362, 371
See application file for complete search history.

(56) References Cited

U.S. PATENT DOCUMENTS

| | | | | |
|---|---|---|---|---|
| 6,161,009 | A * | 12/2000 | Skurdal et al. | 455/423 |
| 7,236,035 | B2 * | 6/2007 | Shiratake et al. | 327/291 |
| 7,500,131 | B2 * | 3/2009 | Panikkar et al. | 713/503 |
| 8,488,729 | B1 * | 7/2013 | Mendel et al. | 375/354 |
| 2006/0045021 | A1 * | 3/2006 | Deragon et al. | 370/249 |
| 2006/0251163 | A1 * | 11/2006 | Fukuma | 375/226 |
| 2007/0072559 | A1 * | 3/2007 | Leukkunen et al. | 455/101 |
| 2013/0188509 | A1 * | 7/2013 | Mellein et al. | 370/252 |
| 2014/0321285 | A1 * | 10/2014 | Chew et al. | 370/236 |

* cited by examiner

*Primary Examiner* — Siu Lee (74) *Attorney, Agent, or Firm* — Weaver Austin Villeneuve & Sampson LLP (57) ABSTRACT

Techniques and mechanisms determine latencies of transmitters of transceivers and use the determined latencies to adjust latencies of the transmitters. For example, a test pattern may be used to determine a first transmitter has a higher latency than a second transmitter. The second transmitter may be provided data indicating a delay to increase its latency such that it matches the first transmitter.

18 Claims, 9 Drawing Sheets

LATENCY BUILT-IN SELF-TEST

TECHNICAL FIELD

This disclosure generally relates to integrated circuits. More specifically, the disclosure relates to systems and methods for determining latency in a circuit such as a transmitter of a transceiver.

DESCRIPTION OF THE RELATED TECHNOLOGY

Transceivers provide communications between different devices. For example, parallel data may be received by a transceiver on a device and converted into serial data (e.g., with a transmitter of the transceiver) for high-speed transmission over a cable, or other physical medium, to another device with another transceiver that receives the serialized data and converts it back into parallel data (e.g., with a receiver of the other transceiver). Multiple transceivers on a device may also provide data to multiple transceivers on another device to create transceiver-transceiver pairs for transmitting and receiving data in a high-speed serial interface.

In a typical scenario, the time for a transceiver to process and provide data at the output of its transmitter may vary from other transceivers. If multiple transceivers on the same device provide data at their outputs at different times, the system using transceivers on both devices may be out of synchronization between different transceiver-transceiver pairs.

Accordingly, a designer may wish to determine the latencies of transmitters of the transceivers and synchronize their performances based on the latencies.

SUMMARY

The subject matter described herein provides a technique for determining the latency of a circuit using a built-in self-test (BIST).

In some scenarios, a designer of an application specific integrated circuit (ASIC) or programmable logic device (PLD) may have logic circuitry generating parallel data to be provided to another chip or device. The designer may couple the logic circuitry generating the parallel data with a high-speed interface using transceivers to serialize the parallel data and transmit it to another transceiver on the other device which receives the serialized data, deserializes it back into parallel data, and provides it to other logic circuitry to analyze the data.

Multiple transceiver-transceiver pairs between the two devices may define different "lanes" of transceivers, each lane having a transmitter of one transceiver providing data to a receiver of another transmitter. However, a lane-to-lane skew between different transceiver-transceiver pairs may exist due to different delays, or latencies, associated with the transceivers. For example, one transceiver may be slightly slower than another transceiver due to fabrication process variations, clock routing differences, different signal strengths associated with data, and other issues. The skew created by the different delay amounts of transceivers may lead to a loss of synchronization between transceivers. That is, transceivers may provide serialized data at different times than other transceivers and transceivers may deserialize the serialized data at different times.

Allowing a device to determine the latency of transceivers may be advantageous. For example, the device may be able to synchronize the transceivers based on the determined latencies.

In one example, a latency built-in self-test (BIST) circuit can determine the latencies of the transmitters of transceivers by generating data, such as a feedback bit, to propagate through a datapath of the transmitter of the transceiver and determining the time it takes to receive the feedback bit back. Additional accuracy and/or precision to the latency measurement can be made by determining a second measurement providing a phase difference between a clock used by the latency BIST circuit and a clock used by the transmitter of the transceiver. Accordingly, latency measurements from several transmitters may be determined. Based on the latency measurements, the latency BIST circuit can adjust the latencies of the transmitters so that they are synchronized.

These and other features will be presented in more detail in the following specification and the accompanying figures, which illustrate by way of example.

DETAILED DESCRIPTION OF PARTICULAR EMBODIMENTS

The following examples illustrate embodiments using transmitters of transceivers. However, the techniques and methodologies disclosed herein may also be used in other types of circuits.

Figure 1:
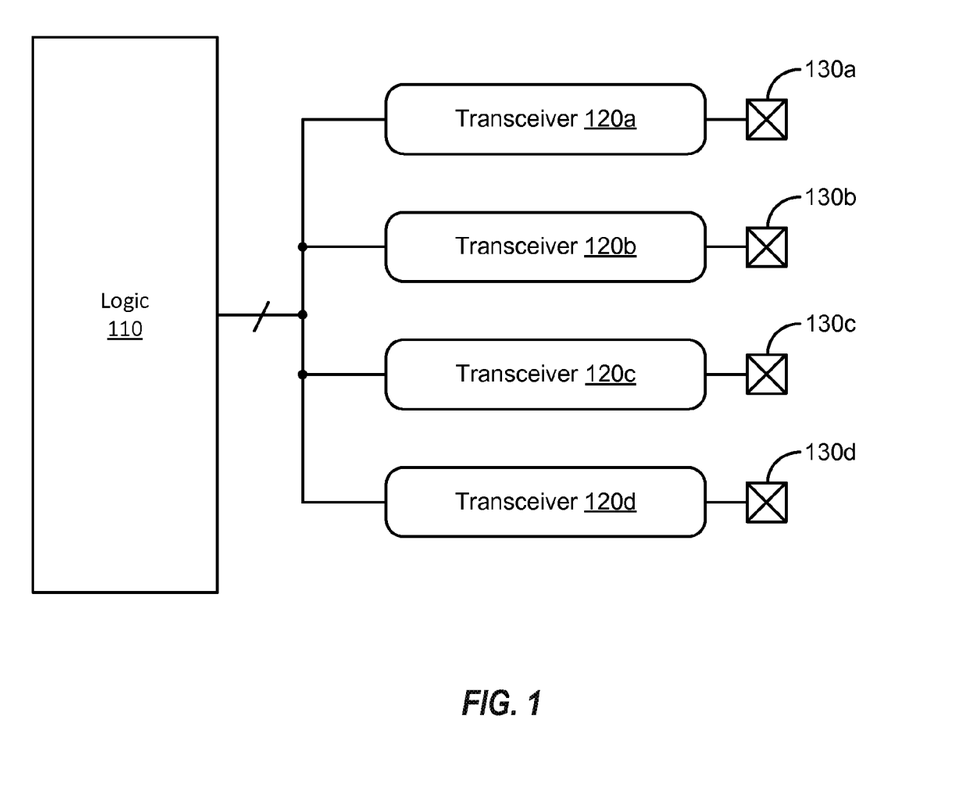
FIG. 1 illustrates an example of transceivers in accordance with some implementations.

FIG. 1 illustrates an example of transceivers in accordance with some implementations. Generally, transceivers may include a transmitter for transmitting data and a receiver for receiving data. In the implementation of FIG. 1, logic 110 provides data to transceivers 120a-120d. Each transceiver 120a-120d provides data at transmitter outputs 130a-130d, respectively. For example, logic 110 may provide parallel data (e.g., 64-bit data on a 64-bit bus) to each of transceivers 120a-120d. The parallel data may be serialized and provided at the respective outputs 130a-130d for transmission.

Though logic 110 in FIG. 1 may provide the same parallel data to each of transceivers 120a-120d, the serialized data may be provided at outputs 130a-130d at different times. The serialized data may be provided at outputs 130a-130d at different times because a transmitter of one transceiver may be slightly slower than another transceiver due to fabrication process variations, clock routing differences, different signal strengths associated with the data, and other issues.

The skew created by the different latencies of transmitters may lead to a loss of synchronization between the transceivers. That is, transceivers may provide serialized data at different times than other transceivers, and therefore the transmission of the data at outputs 130a-130d may occur at different times even if transceivers 120a-120d receive the same parallel data at the same time. For example, transceiver 120a may provide serialized data at output 130a earlier than transceiver 120b provides serialized data at output 130b.

In some implementations, the latencies of the transmitters of transceivers may be measured. Additionally, the measured latencies may be used to better synchronize the transceivers (i.e., have the transmitters of the transceivers provide data at their outputs at approximately the same time). For example, FIG. 2 illustrates a system for determining latency in a transmitter of a transceiver and synchronizing transceivers in accordance with some implementations.

Figure 2:
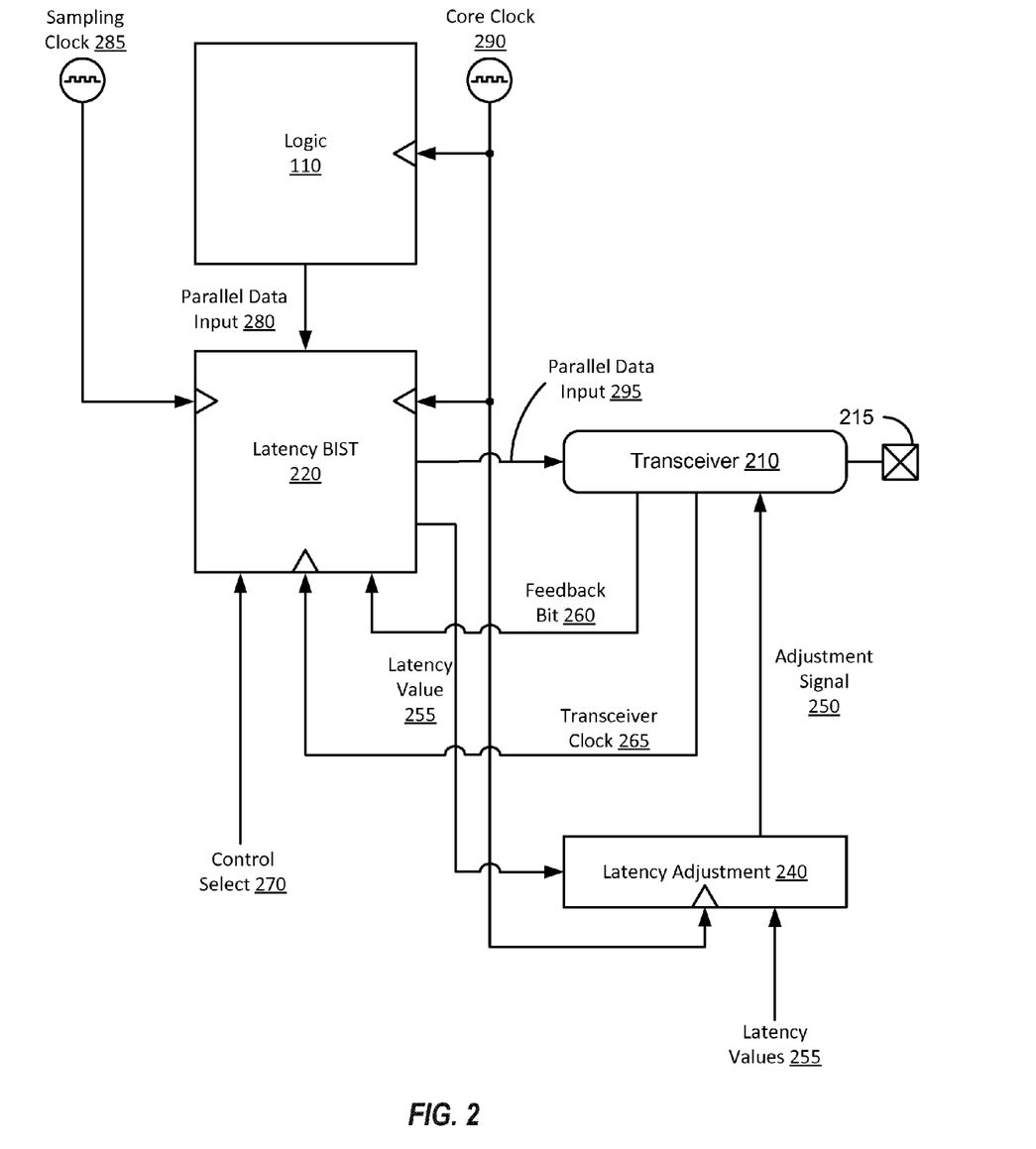
FIG. 2 illustrates an example of a system for determining latency in a transmitter of a transceiver and synchronizing transceivers in accordance with some implementations.

In FIG. 2, latency built-in self-test (BIST) 220 may determine the latency of a transmitter of transceiver 210. In particular, latency BIST 220 may generate latency test data including a "feedback bit" and provide it to transceiver 210 via parallel data input 295. Logic 110 may provide parallel data via parallel data input 280 that is further provided to transceiver 210 via parallel data input 295 during normal operation. However, based on control select 270, the data generated from latency BIST 220 may be provided to transceiver 210 instead during a "test mode" and used to determine the latency in transceiver 210.

Transceiver 210 may process the latency test data (i.e., the latency test data may propagate through a data path of the transmitter of transceiver 210) including the feedback bit and the feedback bit may be provided back to latency BIST 220 via feedback bit 260 to determine the latency of the transmitter of transceiver 210. For example, the time for the feedback bit to propagate through the transmitter of transceiver 210 may indicate the latency of the transmitter of transceiver 210. Latency BIST 220 may generate a latency value corresponding to the latency of the transmitter of transceiver 210 and provide the latency value to latency adjustment 240 via latency value 255. Latency adjustment 240 may also receive latency values corresponding to other transmitters (e.g., from other latency BIST circuits used to measure the latencies of the other transceivers). Based on the set of latency values, adjustment values for the transceivers may be determined and a corresponding adjustment signal 250 may be provided to transceiver 210 to modify the latency of the transmitter. For example, adjustment signal 250 may indicate that transceiver 210 should introduce a slight delay in its transmitter such that the data at output 215 may be better synchronized with the outputs of the other transceivers. In some implementations, adjustment signal 250 may indicate that no delay should be introduced. For example, if transceiver 210 is the transceiver with the highest latency, other transceivers may introduce a latency to more closely match transceiver 210.

Figure 3:
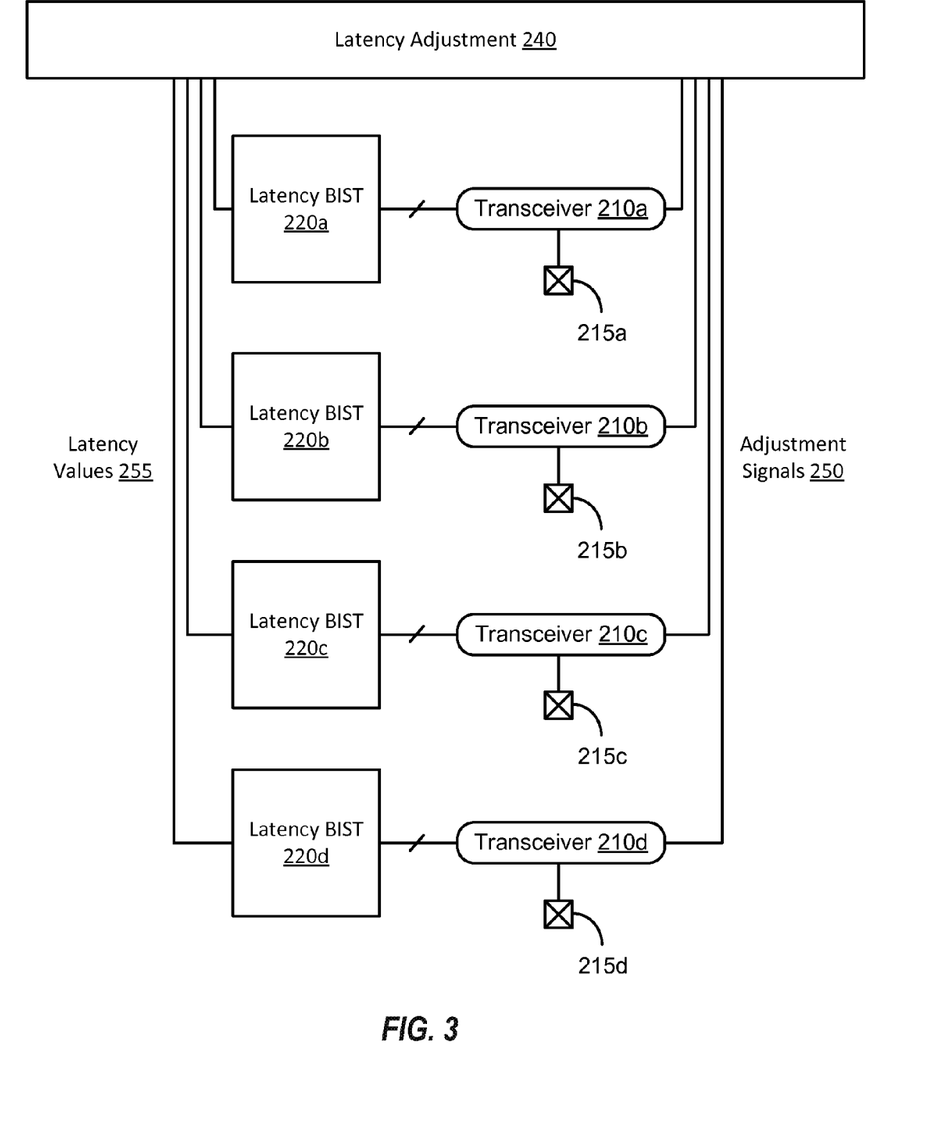
FIG. 3 illustrates an example of a system for adjusting the latency of transceivers in accordance with some implementations.

As another example, FIG. 3 illustrates a system for adjusting the latency of transceivers in accordance with some implementations. In the example of FIG. 3, each latency BIST 220a-220d determines the latency for the corresponding transceiver 210a-210d and provides a latency value 255 to latency adjustment 240. Based on latency values 255 from latency BISTs 220a-220d, latency adjustment 240 may generate adjustment signals 250 for transceivers 210a-210b to change the latency of the associated transmitters, as previously discussed.

For example, latency BIST 220a may determine that the transmitter of transceiver 210a has a 1.0 microsecond (μs) latency. Latency BIST 220b may determine that the transmitter of transceiver 210b has a 1.2 μs latency. Latency BIST 220c may determine that the transmitter of transceiver 210c has a 1.5 μs latency. Latency BIST 220d may determine that the transmitter of transceiver 210d has a 2 μs latency. Each of the determinations may be used to provide latency values 255 to latency adjustment 240.

Based on latency values 255 from latency BISTs 220a-220d, latency adjustment 240 may provide adjustment signals 250 to transceivers 210a-210d to adjust the latency of the transmitters. For example, since latency BIST 220d was determined to have the highest latency (i.e., 2 μs), transceivers 210b-210d may receive data indicating a delay to increase latencies of their transmitters to more closely match the latency of the transmitter of transceiver 210d. Accordingly, latency BIST 220a may receive data to introduce a 1.0 μs delay to increase the latency of transceiver 210a to 2.0 μs. Likewise, transceiver 210b may receive data indicating a 0.8 μs delay to increase the latency of transceiver 210b to 2.0 μs. Transceiver 210c may receive data indicating that a 0.5 μs delay may be introduced to increase the latency of transceiver 210c to 2.0 μs. As such, based on the data provided by adjustment signals 250, the latencies of the transmitters of transceivers 210a-210d may be adjusted such that each transceiver may have similar latencies.

Though the example of FIG. 3 shows four transceivers, any number of transceivers may be used. For example, tens, hundreds, or more transceivers may be used.

Figure 4:
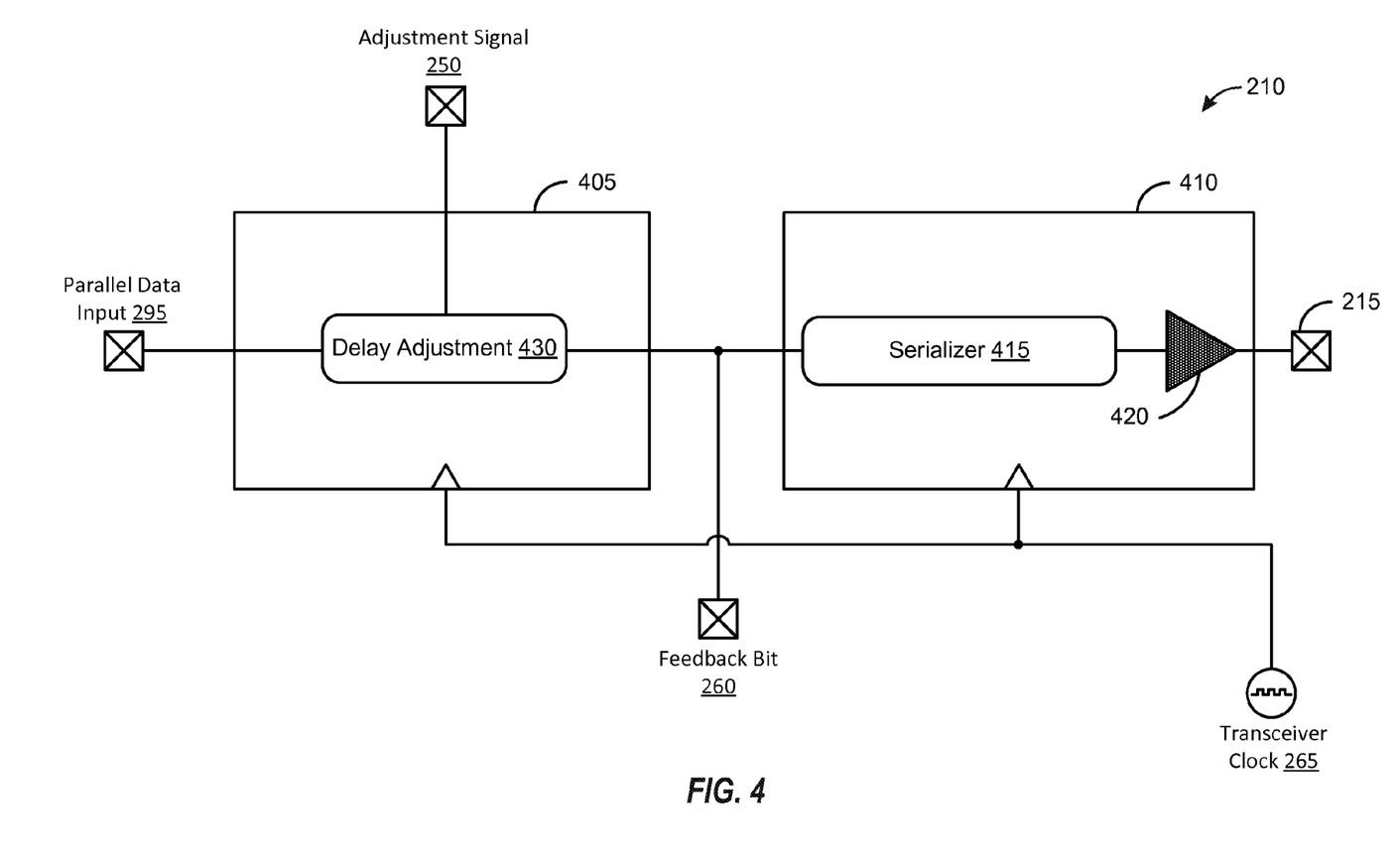
FIG. 4 illustrates an example of a data path of a transmitter of a transceiver in accordance with some implementations.

As previously discussed, the transmitter of transceiver 210 in FIG. 2 may provide feedback bit 260 to latency BIST 220 to determine the latency of the transmitter of transceiver 210. FIG. 4 illustrates an example of a data path of a transmitter of a transceiver in accordance with some implementations. In FIG. 4, the transmitter of transceiver 210 may include two portions: pre-serialization logic 405 and serialization logic 410. Pre-serialization logic 405 may include the physical coding sublayer (PCS) of transceiver 210. Though not shown, the PCS may include a FIFO, an encoder, delay adjustment 430, and other logic for the parallel data received from logic 110 or parallel latency test data from latency BIST 210. Serialization logic 410 may include the physical medium attachment (PMA) of transceiver 210. The PMA may include serializer 415 for converting the parallel data into serial data. Additionally, the PMA may also include buffer 420 which provides the serialized data from serializer 415 to output 215.

Delay adjustment 430 may introduce a delay corresponding to the delay indicated in adjustment signal 250 provided by latency adjustment 240, as previously discussed. That is, a delay may be introduced by delay adjustment 430 in pre-serialization logic 405 before parallel data is serialized by serializer 415 in serialization logic 410. Accordingly, delay adjustment 430 may increase the latency of the transmitter of transceiver 210. In some implementations, delay adjustment 430 may be a "gearbox" in the PCS of the transmitter of transceiver 210 and may perform a "bit slip" to introduce a delay corresponding to delay adjustment 430. In other implementations, delay adjustment 430 may also be used to lower the latencies of the transmitters of transceivers 210a-210d by reducing the delay corresponding to delay adjustment 430 for transceivers 210a-210d.

Additionally, feedback bit 260 is provided before the parallel data is serialized by serializer 415. For example, the parallel data may be a 64-bit bus, but the feedback bit may be provided on a single bit of the 64-bit bus. Accordingly, before the data is serialized, the bit of the bus associated with the feedback bit is "tapped" and provided as feedback bit 260.

In some implementations, the routing to provide feedback bit 260 to latency BIST 220 may be designed to match the delay corresponding to serializer 415 serializing the parallel data and when the serialized data is provided at output 215. Accordingly, the latency from the input of the transmitter of transceiver 210 to the input of latency BIST 210 associated with feedback bit 260 may correspond with the latency from the input of the transmitter of transceiver 210 to output 215.

Transceiver clock 265 may also be provided to the various components of transceiver 210. For example, transceiver clock 265 may be provided to the components within pre-serialization logic 405 and serialization logic 410. Transceiver clock 265 may also be provided to latency BIST 220 in FIG. 2.

In some implementations, buffer 420 may be a tri-state buffer with its output enable provided by control select 270. That is, when control select 270 indicates that the latency test data provided by latency BIST 220 is to be selected to be provided to the transmitter of transceiver 220, buffer 420's output may be tri-stated (i.e., undriven or floating) rather than providing the latency test data at output 215. When control select 270 indicates that parallel data input 280 provided by logic 110 is to be provided to the transmitter of transceiver 210 (e.g., during normal operation), buffer 420 may be enabled to provide serialized data at output 215.

Figure 5:
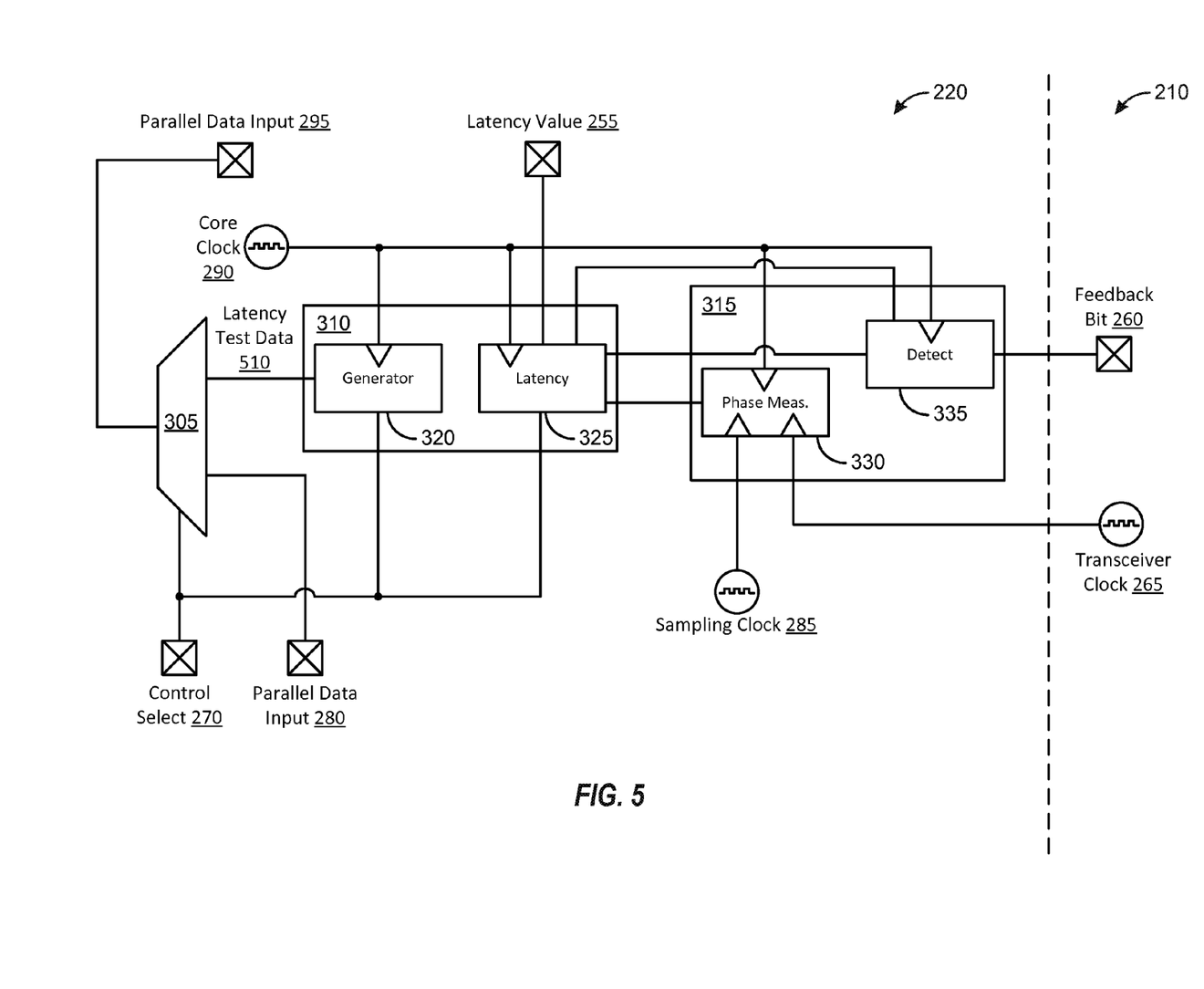
FIG. 5 illustrates an example of a circuit for providing a built-in self-test to determine the latency of a transceiver in accordance with some implementations.
Figure 6:
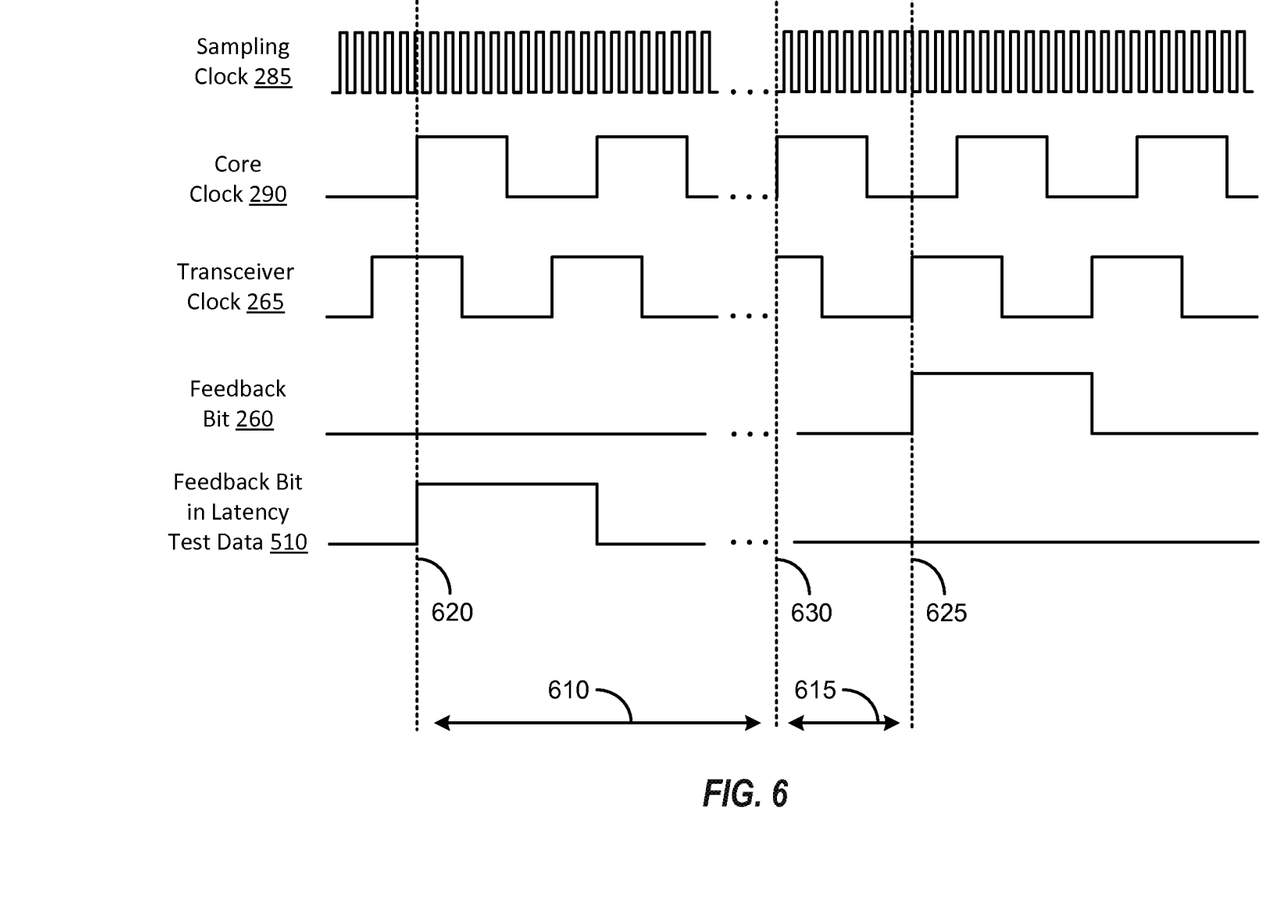
FIG. 6 illustrates an example of a timing diagram of the circuit in FIG. 5 in accordance with some implementations.

FIG. 5 illustrates an example of a circuit for providing a built-in self-test to determine the latency of a transmitter of a transceiver in accordance with some implementations. In particular, FIG. 5 shows a circuit schematic for latency BIST 220 in FIG. 2. FIG. 6 illustrates an example of a timing diagram of the circuit in FIG. 5 in accordance with some implementations.

In FIG. 5, control select 270 may indicate that latency BIST 220 is to determine the latency of the transmitter of transceiver 210. When asserted, control select 270 may indicate generator 320 of latency test data unit 310 is to generate latency test data 510 including a feedback bit. For example, generator 320 may generate latency test data 510 by generating a 64-bit bus data pattern wherein one bit of the 64-bit data may include a single pulse as the feedback bit. In other implementations, latency test data 510 may only be a single bit including only the feedback bit. Accordingly, in FIG. 6, at time 620, the feedback bit in latency test data 510 transitions to a high logic level and provides a pulse representing the feedback bit.

Control select 270 may also indicate latency unit 325 in latency test data unit 310 to initialize. For example, latency unit 325 may prepare to receive data from feedback bit detection 335 and phase measurement 330 in time unit measurements 315 and generate a latency value for transceiver 210 based on time measurements provided by feedback bit detection 335 and phase measurement 330. Latency unit 325 may also provide data to feedback bit detection 335 to initialize or reset and begin a process to determine a first time measurement, as discussed below.

Mux 305 may select between parallel data input 280 (i.e., the data from logic 110) or latency test data 510 based on control select 270. For example, during normal operation, control select 270 may indicate that parallel data input 280 is to be provided to parallel data input 295. During a test mode to determine the latency of the transmitter of transceiver 210, control select 270 may indicate that latency test data 510 is to be provided to parallel data input 295. Accordingly, when latency test data 510 is being generated, a feedback bit from latency test data 510 may be provided to parallel data input 295. As such, feedback bit from latency test data 510 in FIGS. 5 and 6 (i.e., the high bit shown in feedback bit in latency test data 510 in FIG. 6) is provided via parallel data input 295 to the transmitter of transceiver 210.

As such, the feedback bit may propagate through the data path of the transmitter of transceiver 210. As discussed with reference to FIG. 4, feedback bit 260 provides the feedback bit at a point in the transmitter of transceiver 210 (e.g., before the parallel data is serialized by serializer 415). For example, in FIG. 5, feedback bit 260 from the transmitter of transceiver 210 is provided to latency BIST 220. In particular, feedback bit 260 is provided to feedback bit detect 335 of time unit measurement circuit 315 at time 625 in FIG. 6.

Feedback bit detect 335 may provide a time measurement corresponding to the latency of the transmitter of transceiver 210 based on receiving the feedback bit at time 625. Feedback bit detect 335 may provide a number of clock periods, rising edges, falling edges, or any other characteristic of core clock 290 (i.e., the clock provided to feedback bit detect 335) between time 620 (i.e., when the feedback bit is provided to the transmitter of transceiver 210 by generator 320) and time 625. For example, feedback bit detect 335 may provide the number of clock periods between when the feedback bit is generated and provided to the transmitter of transceiver 210 and provided back to feedback bit detect 335.

As an example, the number of clock periods of core clock 290 between time 620 and time 625 may be provided by feedback bit detect 335 and provided to latency unit 325 as a first time measurement indicating the latency of the transmitter of transceiver 210. The count of the number of clock periods may be stopped when feedback bit 260 is received at time 625. The count of the number of clock periods may be provided to latency unit 325. As an example, a counter provided by feedback bit detect 335 may begin counting the rising edges of core clock 290 between time 620 (i.e., the rising edge of core clock 290 when feedback bit in latency test data 510 is provided) and time 625 (i.e., when the feedback bit in feedback bit 260 is provided to feedback bit detect 335). In FIG. 6, the number of full clock cycles of clock core 290 is indicated as time 610 (i.e., the time between a first clock edge of clock core 290 corresponding to the generation of the feedback bit in latency test data 510 and the last clock edge of clock core 290 before the feedback bit is received by feedback bit detect 335, with time 630 indicating the last clock edge of clock core 290 before the feedback bit is received). The number of full clock periods of clock core 290 may be counted by feedback bit detect 335 and provided to latency unit 325. Based on the frequency of clock core 290, the delay corresponding to time 610 may be determined based on the number of clock periods of clock core 290 counted within time 610.

Any measurement of time 610 may be determined by feedback bit detect 335 and provided to latency unit 325 as the first time measurement. For example, the number of full clock periods of core clock 290 within time 610, the duration of time (e.g., 2 microseconds), the number of rising edges, the number of falling edges, a time stamp (e.g., 1:01:23 pm) corresponding to time 610, or any other measurement corresponding to an amount or indication of time may be provided and used as a determination of latency of transceiver 210.

In some implementations, the time measurement provided by feedback bit detect 335 may be used by latency unit 325 to provide latency value 255. For example, if time 610 corresponds to 1 μs, then feedback bit 335 may provide an indication of 1 μs to latency unit 325. Latency unit 325 may provide latency value 255 indicating that transceiver 210 has a 1 μs latency.

A higher level of precision for the latency of the transmitter of transceiver 210 may be determined by additionally measuring the phase difference between core clock 290 and transceiver clock 265. In particular, sampling clock 285 may be used by phase measurement 330 to measure a phase difference between clock core 290 and transceiver 265 and provide a second time measurement to provide further precision for the latency of the transmitter of transceiver 210.

A second time measurement corresponding to the phase difference of core clock 290 and transceiver clock 265 may provide more precision because core clock 290 and transceiver clock 265 may be out of phase with each other. For example, in FIG. 6, time 610 provides a measurement from time 620 (i.e., the rising edge of the generated feedback bit in latency test data 510) to time 630 (i.e., the last rising edge of core clock 290 before time 625). However, feedback bit 260 is provided to feedback bit detect 335 at time 625 (i.e., at a later time than time 630) because transceiver 210 uses transceiver clock 265, and therefore, feedback bit 260 is provided based on transceiver clock 265. Accordingly, the first time measurement (i.e., time 610) provided by feedback bit detect 335 is slightly imprecise and inaccurate due to not including time 615.

Time 615 may be measured by phase measurement 330. In FIG. 6, phase measurement 330 may be provided core clock 290, transceiver clock 265, and sampling clock 285. Phase measurement 330 may determine the phase difference between core clock 290 and transceiver clock 265 by "polling" each of core clock 290 and transceiver clock 265 based on sampling clock 285. For example, in FIG. 6, sampling clock 285 has a higher frequency than core clock 290 and transceiver clock 290. During each period of sampling clock 285 (e.g., on the rising edge), whether core clock 290 and transceiver clock 265 are high and/or low is determined by phase measurement 330. The number of times of sampling clock 285 where core clock 290 and transceiver clock 265 are different (e.g., when core clock 290 is high and transceiver clock 265 is low) may determine the skew, or delay, between core clock 290 and transceiver clock 265, and therefore, provide a second time measurement. That is, a number of clock periods of sampling clock 285 within the delay between core clock 290 and transceiver clock 265 may provide a second time measurement. Accordingly, time 615 may be measured by phase measurement 330 and provided to latency unit 325 as a second time measurement adding additional precision and accuracy for the determination of the latency of transceiver 210.

Though sampling clock 285 may have a higher frequency than either of core clock 290 and transceiver clock 265, in other implementations the frequency of sampling clock 285 may be lower. Generally, a higher frequency of sampling clock 285 may lead to a faster time to determine time 615.

Any measurement of time 615 may be determined by phase measurement 330 and provided to latency unit 325 as the second time measurement. For example, the number of full clock periods of sampling clock 285 within time 615, the duration of time (e.g., microseconds), the number of rising edges, the number of falling edges, a time stamp (e.g., 1:01:23 pm) corresponding to time 615, or any other measurement corresponding to an amount or indication of time may be provided.

In some implementations, measurement of time 615 may be performed repeatedly and an average phase difference between core clock 290 and sampling clock 285 may be determined and provided to latency unit 325 to determine the latency of the transmitter of transceiver 210 in conjunction with the first time measurement provided by feedback bit detect 335 when the feedback bit returns via feedback bit 260. The phase difference may be measured hundreds or thousands of times before, during, and after the feedback bit is generated by generator 320. For example, the phase difference may begin to be measured after the feedback bit is generated by generator 320 and stops after the feedback bit is provided to feedback bit detect 335. The average of the phase difference may then be provided to latency unit 325 as the second time measurement.

As such, the second time measurement from phase measurement 330 and the first time measurement from feedback bit detect 335 may be used by latency unit 325 to generate a new measurement to provide as latency value 255. The first time measurement provided by feedback bit detect 335 may provide a time measurement of a first magnitude and the second time measurement provided by phase measurement 330 may provide another time measure of a second magnitude, with the first magnitude being greater than the second magnitude. In a simplified example, the first time measurement may provide a latency of the transmitter of transceiver 210 in terms of minutes. The second time measurement may provide additional precision in terms of seconds. As another simplified example, if the first time measurement provides an indication that the latency of the transmitter of transceiver 210 is 1 minute and the second time measurement provides an indication that the phase difference between clock core 290 and transceiver clock 260 is 50 seconds, then latency unit 325 may provide data on latency value 255 that the latency of transceiver 210 is 1 minute and 50 seconds (e.g., the latency of transceiver 210 is based on both of the two time measurements provided by feedback bit detect 335 and phase measurement 330). As another example, the first time measurement may provide a latency of 1 microsecond ($\mu$s) and the second time measurement may provide a latency in terms of a fraction of a $\mu$s. Accordingly, combining the first and second time measurements may provide a more accurate and precise characterization of the latency of transceiver 210.

Determining the latency of the transmitter of transceiver 210 as disclosed above may provide a more effective and faster measurement of latency than measuring and/or estimating data latency at different stages of transceiver 210. Providing a run-time BIST may also provide an indication as to the difference in latencies between different transmitter of transceivers may be determined at several different times of operation (e.g., during start-up or other times when calibration or recalibration may be beneficial). Additionally, the system disclosed herein provides for balancing the latencies between different transmitter of transceivers and have a better synchronized system.

The techniques and circuits disclosed herein may be used in any integrated circuit, including both application specific integrated circuits (ASICs) and programmable logic devices (PLDs). If implemented in PLDs, fewer resources may be used within the soft logic of the PLD, and therefore, more resources may be available for logic 110 or any other functionality. For example, latency BIST 220 and latency adjustment 240 may utilize less resources of the soft logic of the PLD than other solutions requiring more than a single feedback bit. Latency adjustment 240 may be scaled to match the number of transceivers used on the PLD, and therefore, only needs the amount of resources based on the design implemented in the PLD. Additionally, fewer resources in a PLD or less area on the silicon die in an ASIC may be used to implement the system because a single 1-bit feedback bit may be used to determine the latency.

Figure 7:
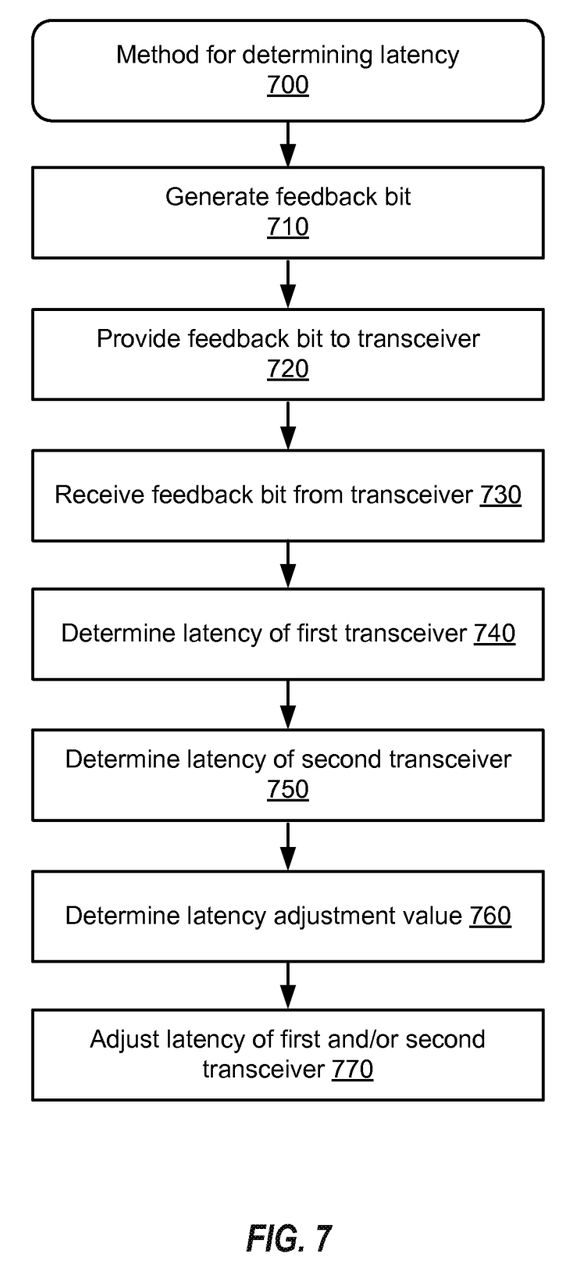
FIG. 7 is a flowchart illustrating a process flow for determining the latency of a transceiver in accordance with some implementations.

FIG. 7 is a flowchart illustrating a process flow for determining the latency of a transceiver in accordance with some implementations. In method 700, at block 710, a feedback bit may be generated. For example, generator 320 may generate the feedback bit. At block 720, the feedback bit may be provided to a transceiver. For example, control select 270 may indicate that mux 305 may select latency test data 510 including the feedback bit generated by generator 320. At block 730, the feedback bit may be received from the transceiver. For example, interconnect associated with the feedback bit may be tapped within transceiver 210 and provided to feedback bit detect 335. At block 740, the latency of the transceiver may be determined. For example, the latency may be determined by making multiple time measurements, as disclosed herein. At block 750, the latency of a second transceiver may be determined. At block 760, latency adjustment values may be determined. For example, the transceiver with the lower latency may be provided a latency adjustment value to increase its latency to more closely match that of the transceiver with the higher latency. At block 770, the latency of the transceiver is adjusted.

Figure 8:
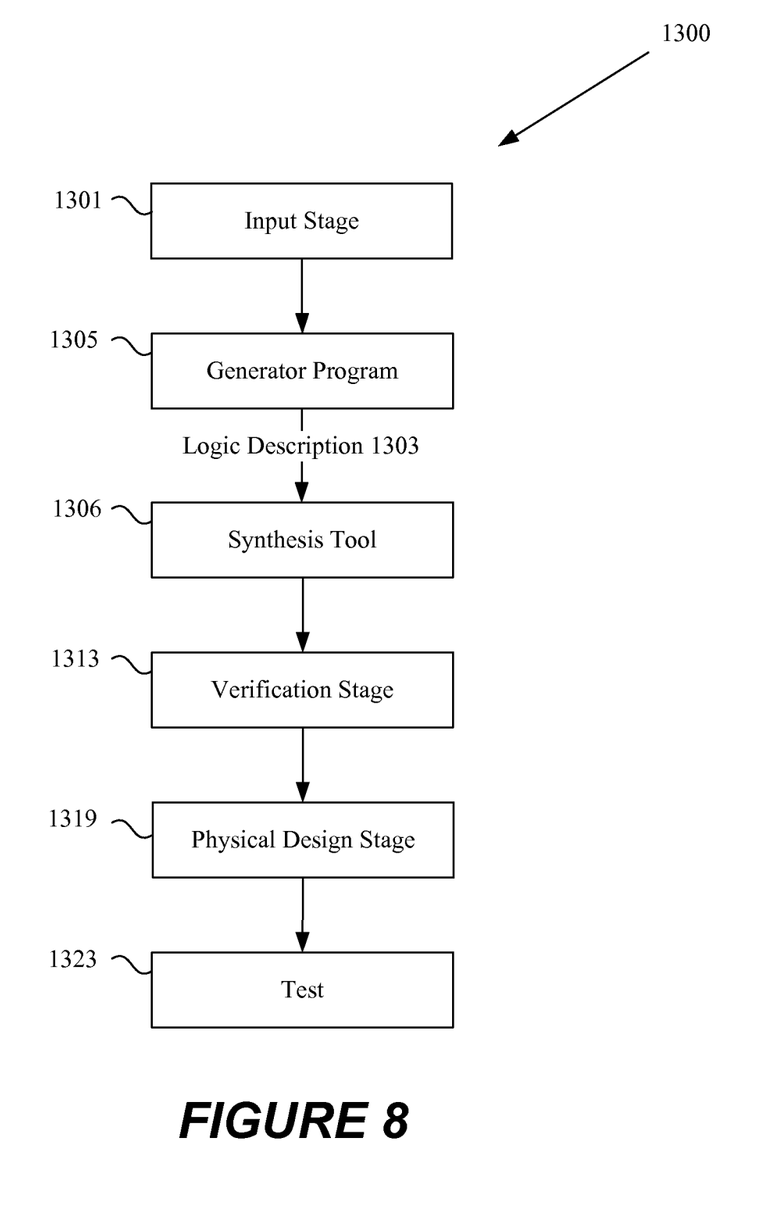
FIG. 8 illustrates a technique for implementing a programmable chip.

As previously discussed, various components may be implemented in a programmable chip. FIG. 8 illustrates a technique for implementing a programmable chip. An input stage 1301 receives selection information typically from a user for logic such as a processor core as well as other components to be implemented on an electronic device. In one example, the input received is in the form of a high-level language program. A generator program 1305 creates a logic description and provides the logic description along with other customized logic to any of a variety of synthesis tools, place and route programs, and logic configuration tools to allow a logic description to be implemented on an electronic device.

In one example, an input stage 1301 often allows selection and parameterization of components to be used on an electronic device. The input stage 1301 also allows configuration of hard coded logic. In some examples, components provided to an input stage include intellectual property functions, megafunctions, and intellectual property cores. The input stage 1301 may be a graphical user interface using wizards for allowing efficient or convenient entry of information. The input stage may also be a text interface or a program reading a data file such as a spreadsheet, database table, or schematic to acquire selection information. The input stage 1301 produces an output containing information about the various modules selected. At this stage, the user may enter security information about individual components that needs to be isolated. For example, different levels of component security and which components are allowed to communicate with each other may be entered.

In typical implementations, the generator program 1305 can identify the selections and generate a logic description with information for implementing the various modules. The generator program 1305 can be a Perl script creating HDL files such as Verilog, Abel, VHDL, and AHDL files from the module information entered by a user. In one example, the generator program identifies a portion of a high-level language program to accelerate. The other code is left for execution on a processor core. According to various embodiments, the generator program 1305 identifies pointers and provides ports for each pointer. One tool with generator program capabilities is System on a Programmable Chip (SOPC) Builder available from Altera Corporation of San Jose, Calif. The generator program 1305 also provides information to a synthesis tool 1307 to allow HDL files to be automatically synthesized. In some examples, a logic description is provided directly by a designer. Hookups between various components selected by a user are also interconnected by a generator program. Some of the available synthesis tools are Leonardo Spectrum, available from Mentor Graphics Corporation of Wilsonville, Oreg. and Synplify available from Synplicity Corporation of Sunnyvale, Calif. The HDL files may contain technology specific code readable only by a synthesis tool. The HDL files at this point may also be passed to a simulation tool.

As will be appreciated by one of skill in the art, the input stage 1301, generator program 1305, and synthesis tool 1307 can be separate programs. The interface between the separate programs can be a database file, a log, or simply messages transmitted between the programs. For example, instead of writing a file to storage, the input stage 1301 can send messages directly to the generator program 1305 to allow the generator program to create a logic description. Similarly, the generator program can provide information directly to the synthesis tool instead of writing HDL files. Similarly, input stage 1301, generator program 1305, and synthesis tool 1307 can be integrated into a single program.

A user may select various modules and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 1307.

A synthesis tool 1307 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 1313 typically follows the synthesis stage 1307. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 1313, the synthesized netlist file can be provided to physical design tools 1319 including place and route and configuration tools. A place and route tool locates logic cells on specific logic elements of a target hardware device and connects wires between the inputs and outputs of the various logic elements in accordance with logic and security provided to implement an electronic design. According to various embodiments of the present invention, the place and route tool may perform the techniques of the present invention to implement the various security requirements and rules as defined by the user. The iterative technique may be transparent to the user, but the resulting device can be physically tested at 1323.

For programmable logic devices, a programmable logic configuration stage can take the output of the place and route tool to program the logic device with the user selected and parameterized modules. According to various embodiments, the place and route tool and the logic configuration stage are provided in the Quartus Development Tool, available from Altera Corporation of San Jose, Calif. As will be appreciated by one of skill in the art, a variety of synthesis, place and route, and programmable logic configuration tools can be used using various techniques of the present invention.

As noted above, different stages and programs can be integrated in a variety of manners. According to one embodiment, the input stage 1301, the generator program 1305, the synthesis tool 1307, the verification tools 1313, and physical design tools 1319 are integrated into a single program. The various stages are automatically run and transparent to a user. The program can receive the user-selected modules, generate a logic description depicting logic for implementing the various selected modules, and implement the electronic device. As will be appreciated by one of skill in the art, HDL files and EDF files are mere examples of a logic description. Other file formats as well as internal program representations are other examples of a logic description.

Figure 9:
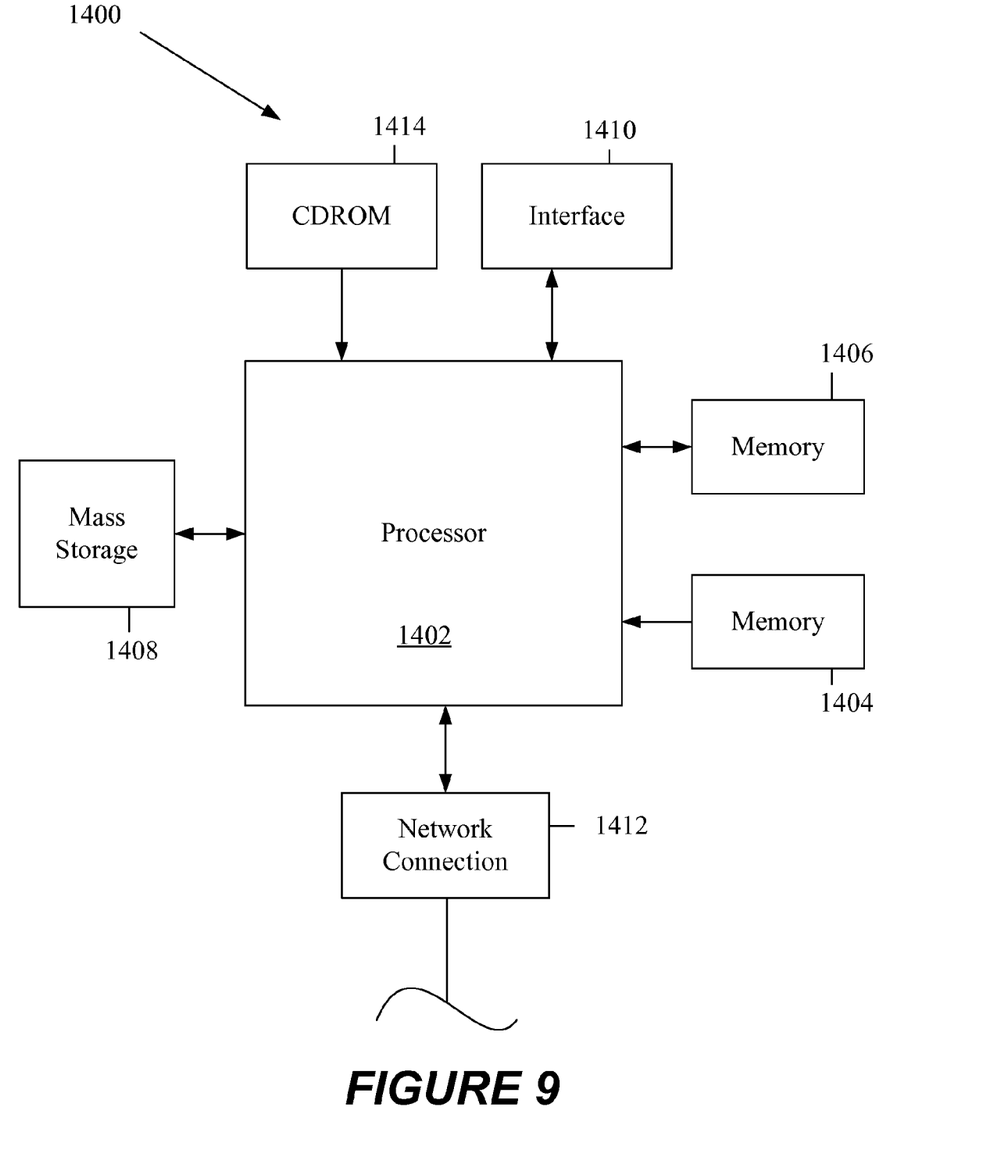
FIG. 9 illustrates one example of a computer system.

FIG. 9 illustrates one example of a computer system. The computer system 1400 includes any number of processors 1402 (also referred to as central processing units, or CPUs) that are coupled to devices including memory 1406 (typically a random access memory, or "RAM"), memory 1404 (typically a read only memory, or "ROM"). The processors 1402 can be configured to generate an electronic design. As is well known in the art, memory 1404 acts to transfer data and instructions uni-directionally to the CPU and memory 1406 are used typically to transfer data and instructions in a bi-directional manner.

Both of these memory devices may include any suitable type of the computer-readable media described above. A mass storage device 1408 is also coupled bi-directionally to CPU 1402 and provides additional data storage capacity and may include any of the computer-readable media described above. The mass storage device 1408 may be used to store programs, data and the like and is typically a secondary storage medium such as a hard disk that is slower than memory. The mass storage device 1408 can be used to hold a library or database of prepackaged logic or intellectual property functions, as well as information on generating particular configurations. It will be appreciated that the information retained within the mass storage device 1408, may, in appropriate cases, be incorporated in standard fashion as part of memory 1406 as virtual memory. A specific mass storage device such as a CD-ROM 1414 may also pass data uni-directionally to the CPU.

CPU 1402 is also coupled to an interface 1410 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. The CPU 1402 may be a design tool processor. Finally, CPU 1402 optionally may be coupled to a computer or telecommunications network using a network connection as shown generally at 1412. With such a network connection, it is contemplated that the CPU might receive information from the network, or might output information to the network in the course of performing the above-described process steps. It should be noted that the system 1400 might also be associated with devices for transferring completed designs onto a programmable chip. The above-described devices and materials will be familiar to those of skill in the computer hardware and software arts.

Although many of the components and processes are described above in the singular for convenience, it will be appreciated by one of skill in the art that multiple components and repeated processes can also be used to practice the techniques of the present invention.

While particular embodiments of the invention have been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of components and should not be restricted to the ones mentioned above. It is therefore intended that the invention be interpreted to include all variations and equivalents that fall within the true spirit and scope of the present invention.

What is claimed is:

1. A system for determining latency, the system comprising:
   a generator circuit for generating a feedback bit;
   a first measurement circuit for receiving the feedback bit, the first measurement circuit providing a first time measurement based on the generation of the feedback bit and receiving the feedback bit;
   a second measurement circuit for receiving a first clock, a second clock, and a third clock, the second measurement circuit providing a second time measurement based on the first clock, the second clock, and the third clock; and
   a latency generation circuit for receiving the first time measurement and the second time measurement, the latency generation circuit generating a third time measurement based on the first time measurement and the second time measurement.

2. The system of claim 1, wherein the first measurement circuit determines the first time measurement based on a first delay associated with a first clock edge of the second clock and a second clock edge of the second clock, the first clock edge of the second clock corresponding to the generation of the feedback bit.

3. The system of claim 2, wherein the second clock edge of the second clock occurs before receiving the feedback bit.

4. The system of claim 1, wherein the second measurement circuit determines the second time measurement based on a second delay associated with a phase shift of the first clock and the second clock.

5. The system of claim 4, wherein the second time measurement is further based on a number of clock periods of the third clock corresponding to the second delay.

6. The system of claim 1, wherein the first time measurement represents more time than the second time measurement.

7. The system of claim 1, further comprising:
   a first transmitter for receiving the feedback bit from the generator circuit and providing the feedback bit to the first measurement circuit.

8. The system of claim 7, further comprising:
   a latency adjustment circuit for receiving the third time measurement and adjusting a latency of the first transmitter based on the third time measurement.

9. The system of claim 1, wherein the first clock is associated with a transceiver.

10. A system for determining latencies of transmitters, the system comprising:

a first transmitter;

a second transmitter;

a first measurement circuit to determine a latency of the first transmitter;

a second measurement circuit to determine a latency of the second transmitter; and a latency adjustment circuit to adjust the latency of the first transmitter based on the determined latency of the first transmitter and the determined latency of the second transmitter, wherein the latency of the first transmitter is determined based on a first time measurement associated with a feedback bit provided to the first transmitter, and a second time measurement associated with a first clock, a second clock, and a third clock.

11. The system of claim 10, wherein the latency of the first transmitter is adjusted to correspond to the determined latency of the second transmitter.

12. The system of claim 10, further comprising:

a generator circuit to generate the feedback bit and provide the feedback bit to the first transmitter, wherein the first time measurement is based on the first measurement circuit receiving the feedback bit from the first transmitter.

13. The system of claim 12, wherein the second time measurement is based on a delay associated with a phase shift of the first clock and the second clock.

14. The system of claim 10, wherein the third clock has a higher frequency than the first clock and the second clock.

15. A method for determining latency, the method comprising:

generating a feedback bit;

providing the feedback bit to a first transmitter;

receiving the feedback bit from the first transmitter; and determining a latency of the first transmitter based on receiving the feedback bit, wherein the latency of the first transmitter is based on a first time measurement based on receiving the feedback bit, and a second time measurement based on a first clock, a second clock, and a third clock.

16. The method of claim 15, wherein the second time measurement is based on a delay associated with a phase shift of the first clock and the second clock, the delay determined by a number of clock periods of the third clock corresponding to the delay.

17. The method of claim 15, wherein the first time measurement is based on a delay associated with a first clock edge of the second clock and a second clock edge of the second clock, the first clock edge of the second clock corresponding to the generation of the feedback bit.

18. The method of claim 15, further comprising:

determining a latency of a second transmitter;

determining a latency adjustment value for the first transmitter based on the latency of the second transmitter and the latency of the first transmitter; and adjusting the latency of the first transmitter based on the latency adjustment value.

\* \* \* \* \*